(12) United States Patent
Seon et al.

(10) Patent No.: US 7,791,262 B2
(45) Date of Patent: Sep. 7, 2010

(54) VACUUM VESSEL, ITS METHOD OF MANUFACTURE, AND ELECTRON EMISSION DISPLAY USING THE VACUUM VESSEL

(75) Inventors: Hyeong-Rae Seon, Suwon-si (KR); Dong-Su Chang, Suwon-si (KR)

(73) Assignee: Samsung SDI Co., Ltd., Gongse-dong, Giheung-gu, Yongin-si, Gyeonggi-do (KR)

(*) Notice: Subject to any disclaimer, the term of this patent is extended or adjusted under 35 U.S.C. 154(b) by 662 days.

(21) Appl. No.: 11/375,028

(22) Filed: Mar. 15, 2006

(65) Prior Publication Data

US 2006/0244363 A1    Nov. 2, 2006

(30) Foreign Application Priority Data

Apr. 29, 2005    (KR)    ...................... 10-2005-0035983

(51) Int. Cl.
*H01J 1/62*     (2006.01)
*H01J 63/04*    (2006.01)
*H01J 1/18*     (2006.01)
*H01K 1/18*     (2006.01)
*G02F 1/1339*   (2006.01)

(52) U.S. Cl. .................. 313/495; 313/483; 313/496; 313/497; 313/238; 313/292; 349/155; 349/156; 349/56

(58) Field of Classification Search ........................ None
See application file for complete search history.

(56) References Cited

U.S. PATENT DOCUMENTS

| | | | |
|---|---|---|---|
| 4,920,298 A * | 4/1990 | Hinotani et al. | ............. 313/493 |
| 5,037,185 A | 8/1991 | Grupp | |
| 5,742,006 A | 4/1998 | Grupp et al. | |
| 6,153,973 A * | 11/2000 | Shibata et al. | ............. 313/495 |
| 6,219,127 B1 | 4/2001 | Hirakata et al. | |
| 6,476,547 B1 * | 11/2002 | Kawase | ..................... 313/495 |
| 6,611,312 B2 * | 8/2003 | Kijima et al. | ................ 349/153 |
| 6,704,072 B2 | 3/2004 | Jeong et al. | |
| 6,864,943 B2 | 3/2005 | Hirakata et al. | |
| 7,068,343 B2 | 6/2006 | Saitoh | |

(Continued)

FOREIGN PATENT DOCUMENTS

EP    1 389 792    2/2004

(Continued)

OTHER PUBLICATIONS

European Search Report for European Application No. 06113207.2-2208 issued on Nov. 2, 2006.

*Primary Examiner*—Sikha Roy
*Assistant Examiner*—Natalie K Walford
(74) *Attorney, Agent, or Firm*—Robert E. Bushnell, Esq.

(57) ABSTRACT

A vacuum vessel includes a first substrate, a second substrate facing the first substrate and spaced apart therefrom, and support frames mounted along the edges of the first and the second substrates. At least two support frames are separately formed on at least one side of the first and the second substrates. Adhesive layers are placed on a surface of the support frame facing the first substrate as well as on the opposite-surface of the support frame facing the second substrate to attach the two substrates and the support frames to each other. A filler is disposed between the neighboring support frames to prevent the vacuum leakage.

13 Claims, 5 Drawing Sheets

U.S. PATENT DOCUMENTS

| | | |
|---|---|---|
| 7,405,798 B2 | 7/2008 | Yoo et al. |
| 7,429,819 B2 * | 9/2008 | Kijima et al. ............... 313/292 |
| 7,501,751 B2 * | 3/2009 | Kijima et al. ............... 313/496 |
| 7,515,241 B2 | 4/2009 | Kim et al. |
| 7,548,297 B2 | 6/2009 | Shigemura et al. |
| 2001/0017684 A1 | 8/2001 | Hirakata et al. |
| 2002/0021081 A1 * | 2/2002 | Tajima et al. ............... 313/495 |
| 2002/0027635 A1 | 3/2002 | Sakamaki et al. |
| 2002/0097368 A1 | 7/2002 | Kijima et al. |
| 2002/0178562 A1 | 12/2002 | Aoki et al. |
| 2004/0138042 A1 | 7/2004 | Shimosaka et al. |
| 2005/0088072 A1 | 4/2005 | Yang et al. |
| 2005/0140912 A1 | 6/2005 | Hirakata et al. |
| 2005/0179362 A1 | 8/2005 | Kijima et al. |
| 2006/0244362 A1 * | 11/2006 | Seon et al. ................... 313/495 |
| 2007/0090760 A1 * | 4/2007 | Seon .......................... 313/562 |
| 2008/0266510 A1 | 10/2008 | Yoshihara et al. |

FOREIGN PATENT DOCUMENTS

| | | |
|---|---|---|
| EP | 1 553 612 | 7/2005 |
| JP | 10-302685 | 11/1998 |
| JP | 2003-121292 | 4/2003 |
| JP | 2004-087429 | 3/2004 |
| JP | 2005-131666 | 5/2005 |
| JP | 2006-107952 | 4/2006 |

* cited by examiner

VACUUM VESSEL, ITS METHOD OF MANUFACTURE, AND ELECTRON EMISSION DISPLAY USING THE VACUUM VESSEL

CLAIM OF PRIORITY

This application makes reference to, incorporates the same herein, and claims all benefits accruing under 35 U.S.C. §119 from an application for VACUUM VESSEL, METHOD OF MANUFACTURING THE VACUUM VESSEL, AND ELECTRON EMISSION DISPLAY DEVICE USING THE VACUUM VESSEL earlier filed in the Korean Intellectual Property Office on the 29$^{th}$ of Apr. 2005 and there, duly assigned Serial No. 10-2005-0035983.

BACKGROUND OF THE INVENTION

1. Field of the Invention

The present invention relates to a vacuum vessel, and more particularly, to a vacuum vessel in which first and second substrates are sealed together using support frames and adhesive layers, and a method of manufacturing the vacuum vessel and an electron emission display using the vacuum vessel.

2. Description of Related Art

Generally, electron emission devices are classified into those using hot cathodes as an electron emission source, and those using cold cathodes as the electron emission source. There are several types of cold cathode electron emission devices, including Field Emitter Array (FEA) devices, Metal-Insulator-Metal (MIM) devices, Metal-Insulator-Semiconductor (MIS) devices, and Surface Conduction Emitter (SCE) devices.

The electron emission device is used as an electron emission structure for an image display or a light emission source such as backlight. With the typical structure of an electron emission display using the electron emission device, first and second substrates face each other, and electron emission regions are formed on the first substrate together with driving electrodes for controlling the emission of electrons from the electron emission regions. Phosphor layers, and an anode electrode to place the phosphor layers in a high potential state are formed on a surface of the second substrate facing the first substrate.

The first and the second substrates are sealed together at their peripheries using a sealing member, and the inner space between the substrates is exhausted to form a vacuum vessel such that the emission and migration of electrons can occur smoothly. With a vacuum vessel, a frit bar is used as the sealing member. The frit bar is prepared by press-forming a mixture of a glass frit and an organic compound.

With the process of forming a vacuum vessel using the frit bar, the frit bar is placed at the periphery of one of the first and the second substrates, and the other substrate is aligned over the frit bar, followed by melting the surface of the frit bar through firing and attaching the two substrates together. The inner space between the two substrates is exhausted through an exhaust tube provided on one of the substrates, and the end of the exhaust tube is sealed in a vacuum tight manner. However, since out-gassing occurs from the frit bar under a high temperature atmosphere, the interior of the vacuum vessel is contaminated, and the degree of vacuum thereof is lowered.

In order to solve such a problem, it has been proposed that the amount of usage of the frit should be reduced by sealing the first and the second substrates together using a glass bar and an adhesive layer. The glass bar is formed with a length corresponding to the respective sides of the first and the second substrates, and provided at the respective sides of the two substrates.

However, since the electron emission display has been recently large-scaled, the glass bar is liable to be twisted so that the flatness of the glass bar and the vacuum vessel is deteriorated, and the glass bar is easily broken, deteriorating the work efficiency.

SUMMARY OF THE INVENTION

In one exemplary embodiment of the present invention, a vacuum vessel is provided which inhibits the lowering of the degree of vacuum due to the out-gassing from the sealing member and includes a flattened glass bar and enhanced processing efficiency, and a method of manufacturing the vacuum vessel and an electron emission display using the vacuum vessel.

In an exemplary embodiment of the present invention, the vacuum vessel includes: a first substrate; a second substrate facing the first substrate and spaced apart therefrom; and support frames arranged along edges of the first and the second substrates, at least two of the support frames being separately formed on at least one side of the first and the second substrates.

The first and the second substrates preferably have a pair of long sides and a pair of short sides, and the support frames are preferably arranged on the two long sides of the first and the second substrates with a length less than or equal to half of the length of the long side.

The first and the second substrates preferably have a pair of long sides and a pair of short sides, and the support frames are preferably arranged on the respective sides of the first and the second substrates with a length less than or equal to half of the length of the side.

The support frame preferably has a height corresponding to a distance between the first and the second substrates. The support frame preferably includes a material selected from the group consisting of glass, ceramics, a mixture of glass and ceramics, reinforced glass, and a mixture of ceramics and reinforced glass. The support frame preferably has a thermal expansion coefficient of 8.5~9.0 ppm/° C.

The vacuum vessel preferably further includes adhesive layers arranged on a surface of the support frames facing the first substrate and on an opposite-surface of the support frames facing the second substrate, and a filler preferably arranged between neighboring support frames. The adhesive layers and the fillers preferably include a glass frit.

A method of manufacturing a vacuum vessel according to an exemplary embodiment of the present invention includes: forming an adhesive layer on an edge of one substrate; forming support frames with a length less than or equal to half of the length of a side of the substrate on at least one side of the substrate; mounting the support frames on the adhesive layer of the substrate; arranging a filler between the support frames; mounting another substrate having an adhesive layer on a surface thereof facing the one substrate on the support frames; and firing the adhesive layers and the fillers to attach the substrates and the support frames together.

The adhesive layer is preferably formed with a thickness of 300~500 μm.

The substrates preferably have a pair of long sides and a pair of short sides, and the support frames preferably have a length less than or equal to half of the length of the long side. The substrates preferably have a pair of long sides and a pair of short sides, and the support frames preferably have a length less than or equal to half of the long and the short sides.

In another exemplary embodiment of the present invention, an electron emission display includes: a first substrate; a second substrate facing the first substrate and spaced apart therefrom; an electron emission unit arranged on the first substrate; a light emission unit arranged on the second substrate; and a sealing member arranged at peripheries of the first and the second substrates to define a vacuum vessel together with the two Substrates. The sealing member includes at least two support frames separately formed on at least one side of the first and the second substrates, and adhesive layers arranged between the first substrate and the support frames and between the second substrate and the support frames.

The sealing member preferably further includes a filler arranged between neighboring support frames.

The first and the second substrates preferably have a pair of long sides and a pair of short sides, and the support frames are preferably arranged on the two long sides of the first and the second substrates with a length less than or equal to half of the long side. The first and the second substrates preferably have a pair of long sides and a pair of short sides, and the support frames are preferably arranged on the respective sides of the first and the second substrates with a length less than or equal to half of the length of the side.

The adhesive layer preferably has a thickness of 300~500 µm.

BRIEF DESCRIPTION OF THE DRAWINGS

A more complete appreciation of the present invention and many of the attendant advantages thereof, will be readily apparent as the present invention becomes better understood by reference to the following detailed description when considered in conjunction with the accompanying drawings in which like reference symbols indicate the same or similar components, wherein.

DETAILED DESCRIPTION OF INVENTION

Figure 1:
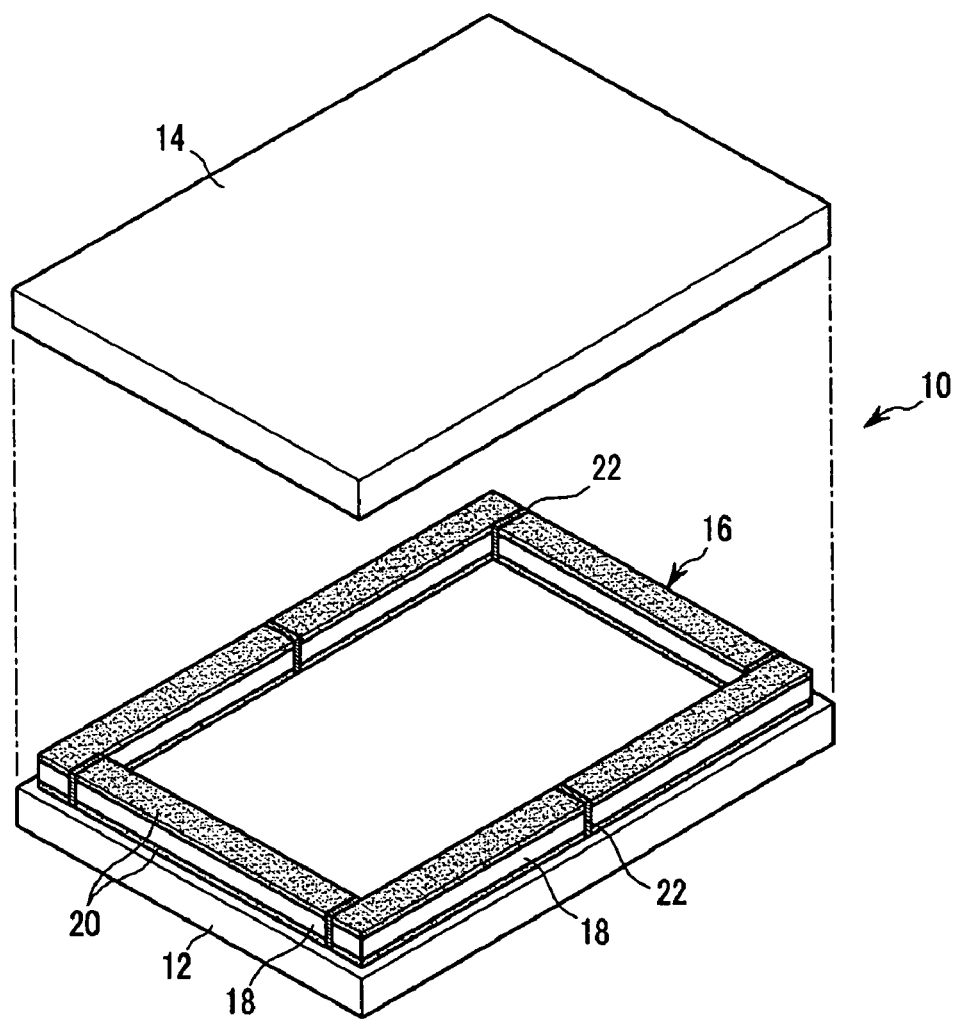
FIG. 1 is an exploded perspective view of a vacuum vessel according to an embodiment of the present invention.
Figure 2:
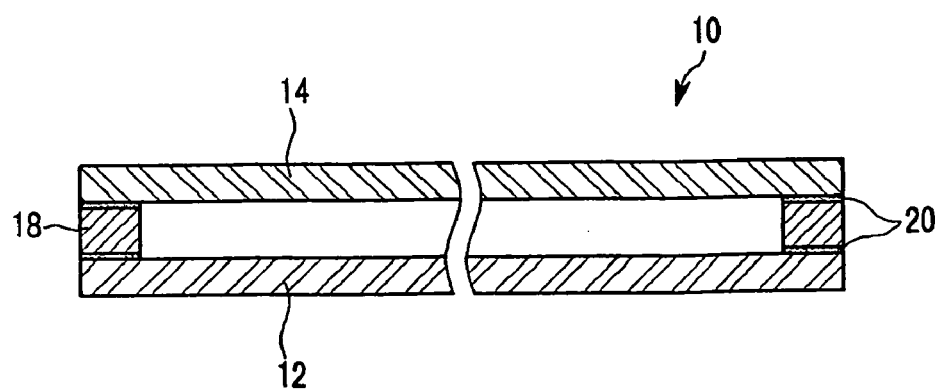
FIG. 2 is a cross sectional view of the vacuum vessel according to the embodiment of the present invention.
Figure 3:
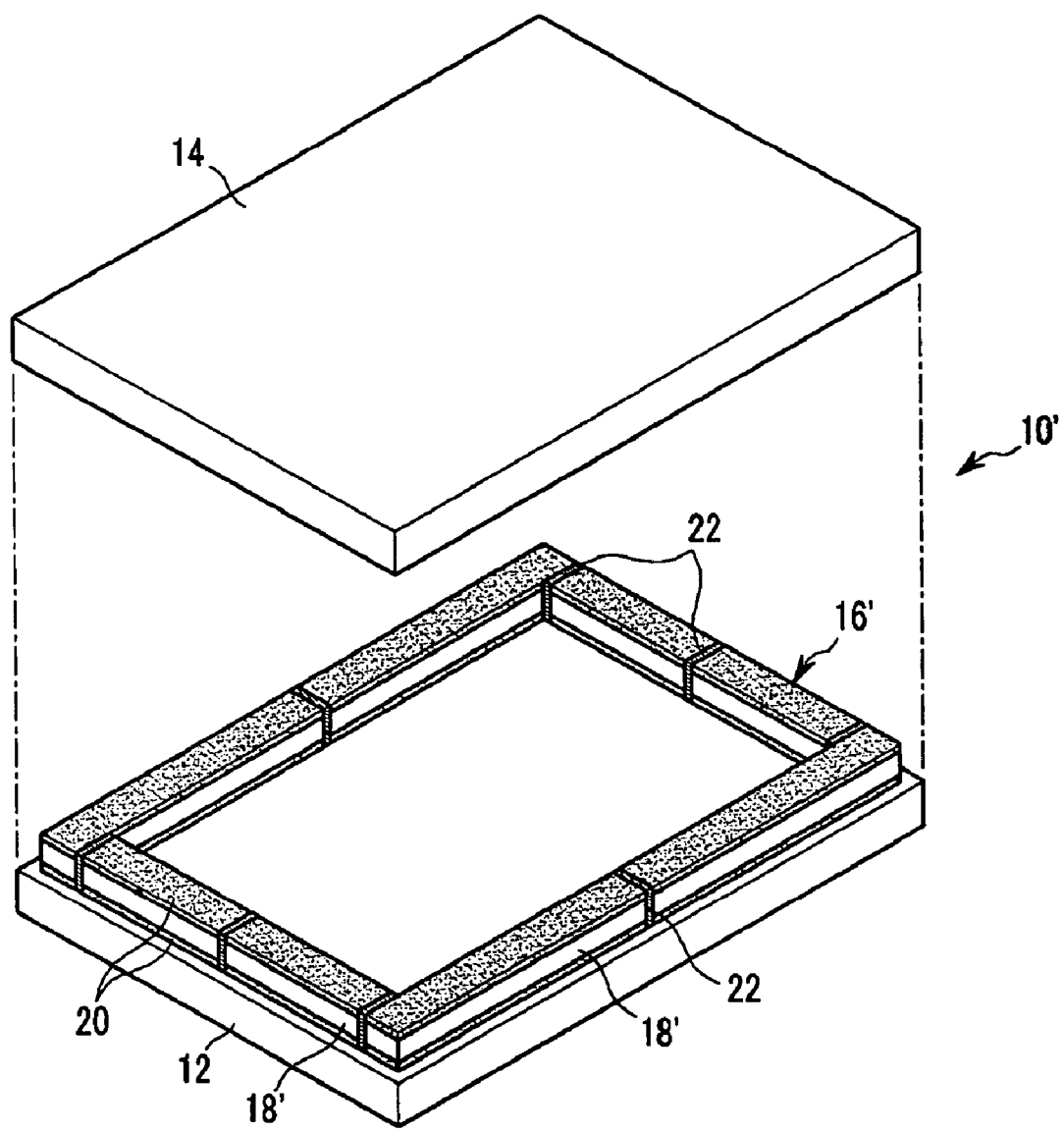
FIG. 3 is an exploded perspective view of a vacuum vessel according to another embodiment of the present invention.

As shown in FIGS. 1 to 3, the vacuum vessel 10 according to an embodiment of the present invention includes first and second substrates 12 and 14 facing each other and spaced apart by a predetermined distance, and a sealing member 16 provided at the peripheries of the first and the second substrates 12 and 14 to seal them together. The interior of the vacuum vessel 10 is kept to a degree of vacuum of about $10^{-6}$ torr.

The sealing member 16 has two or more support frames 18 formed on at least one side of the first and the second substrates 12 and 14, adhesive layers 20 placed between the first substrate 12 and the support frames 18 as well as between the second substrate 14 and the support frames 18 to attach the two substrates 12 and 14 and the support frames 18 to each other, and a filler 22 provided at the interface between the neighboring support frames 18 to attach them together.

The support frames 18 are formed of glass, ceramics, a mixture of glass and ceramics, reinforced glass, or a mixture of ceramics and reinforced glass. The support frames 18 are placed at the peripheries of the first and the second substrates 12 and 14 to maintain the distance between the two substrates 12 and 14 in a stable manner. The support frame 18 is formed on at least one side of the two substrates 12 and 14 with a length less than or equal to one half of the length of the two substrates 12 and 14.

When the first and the second substrates 12 and 14 are formed in the shape of a rectangle with a pair of long sides and a pair of short sides, as shown in FIG. 1, one support frame 18 is placed at the short sides of the two substrates 12 and 14, and two support frames 18 are separately placed at the long sides of the two substrates 12 and 14. Alternatively, as shown in FIG. 3, two support frames 18' can be separately formed both at the long and the short sides of the two substrates 12 and 14.

The number of support frames 18 provided at each side of the two substrates 12 and 14 is not limited to that of the drawing figures, and it is possible for three or more support frames 18 to be provided at each side.

With the above structure, the longer the length of each support frame 18, the more liable the support frame 18 is to be twisted. The greater the number of support frames 18, the more difficult it is to combine those support frames 18. Therefore, the number of support frames 18 provided at each side of the two substrates 12 and 14 is determined considering the optimum length of the support frames 18 capable of minimizing the twisting thereof, and the combination easiness.

The support frames 18 are formed of the same material as the first and the second substrates 12 and 14 or of a material having a thermal expansion coefficient of 8.5~9.0 ppm/° C., that is similar to that of the two substrates 12 and 14, such that it exhibits a thermal behavior similar to the first and the second substrates 12 and 14. Furthermore, the support frames 18 have a height corresponding to the distance between the first and the second substrates 12 and 14, for instance, a height of 2 mm, and a width of 3~8 mm.

The adhesive layers 20 and the fillers 22 can be formed of a glass frit, and can form a sealing member 16 together with the support frames 18 to attach the two substrates 12 and 14 together and seal the interior of the vacuum vessel 10 in a vacuum tight manner. The gap between the two support frames 18 where the filler 22 is placed accommodates the thermal expansion of the support frames 18 when the support frames 18 are expanded in the longitudinal direction thereof during the high temperature process, thereby preventing the distortion of the support frames 18 from the twisting thereof.

A method of manufacturing a vacuum vessel according to an embodiment of the present invention is explained below in detail.

Figure 4:
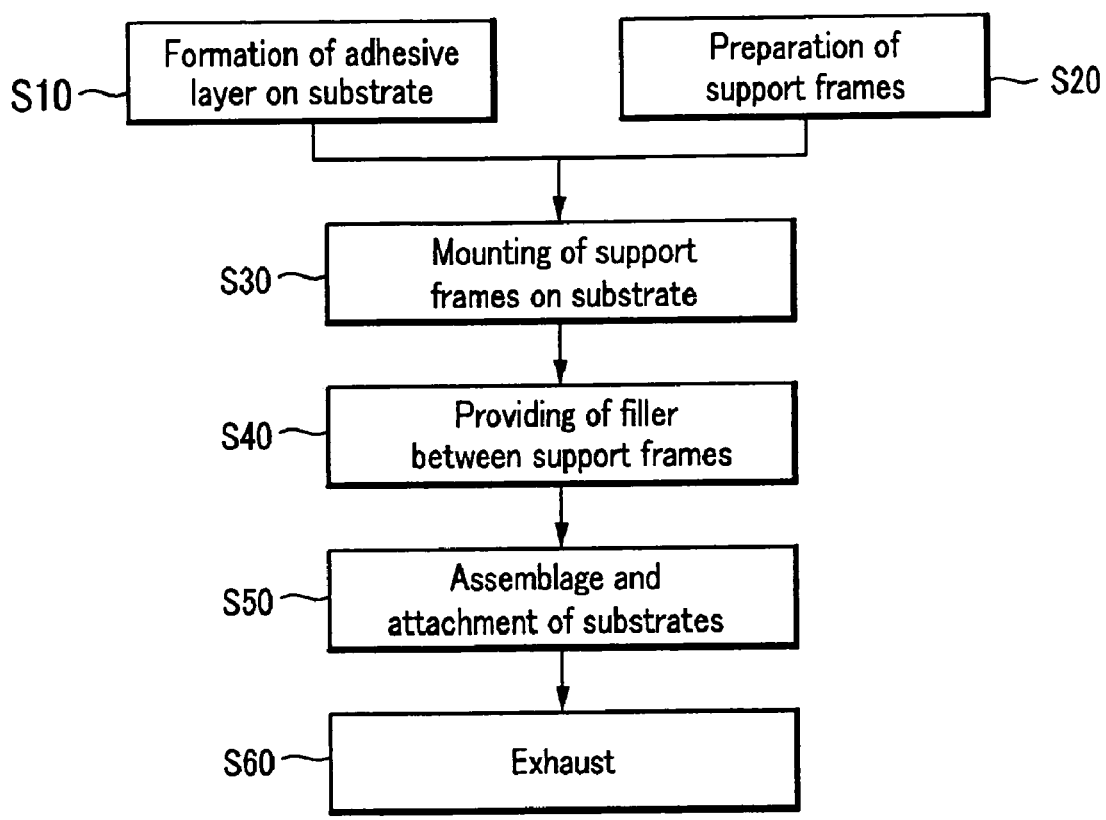
FIG. 4 is a flowchart of the steps of processing a vacuum vessel according to an embodiment of the present invention.
Figure 5:
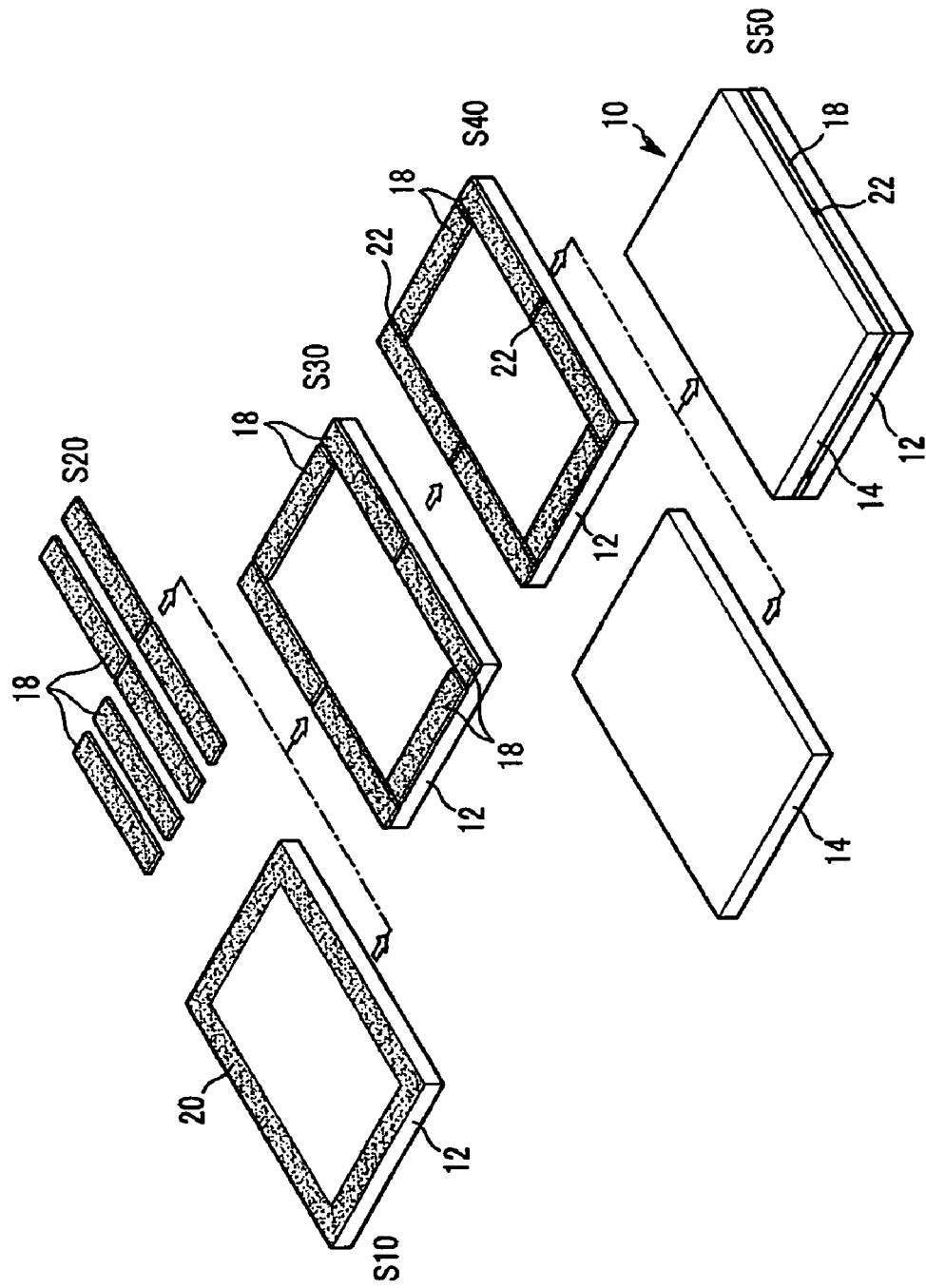
FIG. 5 is a view of the process of manufacturing the vacuum vessel according to the embodiment of the present invention.

As shown in FIGS. 4 and 5, in step S10, an adhesive layer 20 is formed along the edge of a substrate (for instance, the first substrate 12). In step S20, support frames 18 each with a length less than or equal to one half the length of a side of the first substrate 12, and support frames 18 each with a length corresponding to another side of the first substrate 12 are prepared. In step S30, the support frames 18 are mounted on the adhesive layer 20 of the first substrate 12. In step S40, a filler 22 is provided at the interface between the neighboring support frames 18. In step S50, a second substrate 14 having an adhesive layer (not shown) at a surface thereof facing the first substrate 12 is aligned over the support frames 18, and the adhesive layers 20 and the fillers 22 are fired, and have their surfaces melted to thereby attach the first substrate 12, the support frames 18 and the second substrate 14 together. In step S60, the inner space between the first and the second substrate 12 and 14 is exhausted through an exhaust tube (not shown) provided on one of the first and the second substrates 12 and 14, and the end of the exhaust tube is sealed in a vacuum tight manner.

The adhesive layer 20 has a thickness of about 300~500 µm. When the thickness of the adhesive layer 20 is less than 300 µm, it is liable to be partially cut, and the adhesion between the first and the second substrates 12 and 14 and the support frame 18 can be weak. By contrast, when the thickness of the adhesive layer 20 exceeds 500 µm, out-gassing is generated by the adhesive layer 20 so that the degree of vacuum of the vacuum vessel 10 is lowered, or the sliding of the substrates occurs, thereby deteriorating the characteristics of the vacuum vessel 10.

In the drawings, two support frames 18 are provided at the long sides of the two substrates 12 and 14, and one support frame 18 is provided at the short sides of the two substrates 12 and 14. However, the number and arrangement of support frames are not limited to those illustrated, but can be altered in various manners.

With the above-described structure of the vacuum vessel 10 and the manufacturing method thereof, since several support frames 18 having a small length are provided, they are prevented from being twisted even when the vacuum vessel 10 is large-scaled. Therefore, the support frames 18 and the vacuum vessel 10 are very flat. Since the support frame 10 with a shortened length is easily handled, it is prevented from being broken during the processing thereof.

With the structure where a support frame is provided at each side of the first and the second substrates, the support frame should be separately formed per the respective sizes of the vacuum vessels. By contrast, with the above-described structure, the support frames 18 are standardized, and easily applied for use in manufacturing vacuum vessels 10 of various sizes.

With the above-described vacuum vessel 10, an electron emission unit is provided on a surface of the first substrate 12 facing the second substrate 14, and a light emission unit is provided on a surface of the second substrate 14 facing the first substrate 12, thereby constructing an electron emission display. As examples of an electron emission display using the vacuum vessel 10, a Field Emitter Array (FEA) display and a Surface Conduction Emitter (SCE) display are discussed below.

Figure 6:
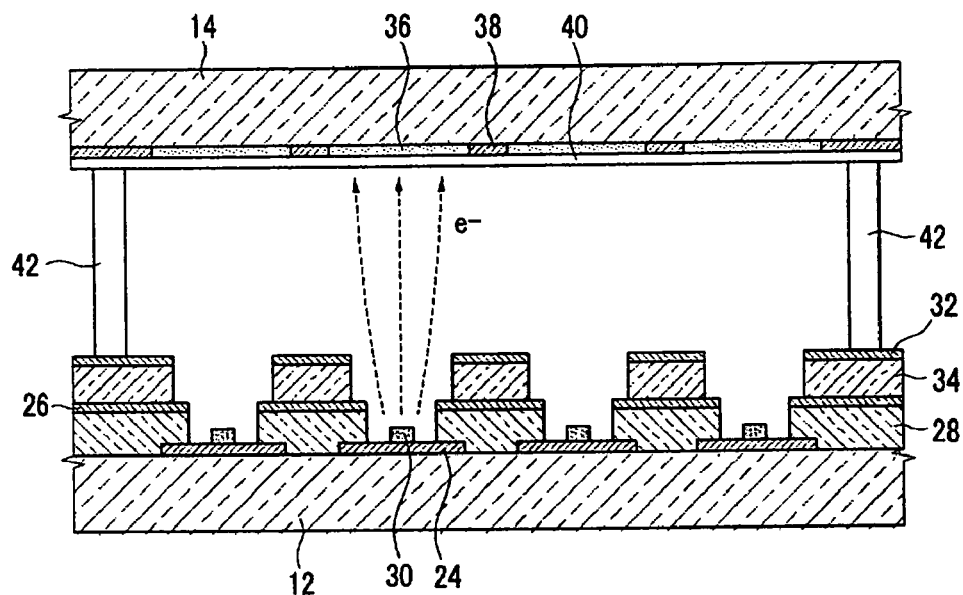
FIG. 6 is a partial sectional view of an Field Emitter Array (FEA) electron emission display using a vacuum vessel according to an embodiment of the present invention.

As shown in FIG. 6, with an FEA electron emission display, cathode electrodes 24, which are the first electrodes, and gate electrodes 26, which are the second electrodes, cross each other on a first substrate 12 with a first insulating layer 28 interposed therebetween. Electron emission regions 30 are formed on the cathode electrodes 24 at the crossed regions of the cathode electrodes 24 and the gate electrodes 26. Openings are formed in the first insulating layer 28 and the gate electrodes 26 corresponding to the respective electron emission regions 30, and expose the electron emission regions 30.

The electron emission regions 30 are formed of a material emitting electrons when an electric field is applied thereto under a vacuum atmosphere, such as a carbonaceous material or a nanometer-sized material. The electron emission regions 30 can be formed of carbon nanotubes, graphite, graphite nanofibers, diamonds, diamond-like carbon, $C_{60}$, silicon nanowires or a combination thereof.

It is explained above that the gate electrodes 26 are placed over the cathode electrodes 24 with the first insulating layer 28 interposed therebetween. However, it is also possible for the gate electrodes 26 to be placed under the cathode electrodes 24 with the first insulating layer 28 interposed therebetween. In this case, the electron emission regions 30 can contact the lateral surface of the cathode electrodes 24 on the first insulating layer 28.

A focusing electrode 32, which is a third electrode, is formed on the gate electrodes 26 and the first insulating layer 28. A second insulating layer 34 is placed under the focusing electrode 32 to insulate the focusing electrode 32 from the gate electrodes 26, and openings are formed in the second insulating layer 34 and the focusing electrode 32 to pass the electron beams.

Phosphor layers 36 and black layers 38 are formed on a surface of the second substrate 14 facing the first substrate 12, and an anode electrode 40 is formed on the phosphor layers 36 and the black layers 38 of a metallic material, such as aluminum. The anode electrode 40 receives a high voltage required for accelerating the electron beams, and reflects the visible light rays radiated from the phosphor layers 36 to the first substrate 12 toward the second substrate 14, thereby heightening the screen luminance.

The anode electrode can be formed of a transparent conductive material, such as Indium Tin Oxide (ITO), instead of the metallic material. In this case, the anode electrode is placed on a surface of the phosphor layers and the black layers facing the second substrate. Furthermore, the anode electrode can be formed of a double-layered structure having a transparent conductive material-based layer and a metallic material-based layer.

Spacers 42 are arranged between the first and the second substrates 12 and 14 to support the vacuum vessel under the pressure applied thereto, and space the first and the second substrates 12 and 14 apart from each other by a predetermined distance. The spacers 42 are located corresponding to the black layers 38 such that they do not occupy the area of the phosphor layers 36.

With the above structure, when predetermined driving voltages are supplied to the cathode and the gate electrodes 24 and 26, electric fields are formed around the electron emission regions 30 due to the voltage difference between the two electrodes 24 and 26, and electrons are emitted from the electron emission regions 30. The emitted electrons are focused to the center of the bundle of electron beams while passing the openings of the focusing electrode 32, and attracted by the high voltage supplied to the anode electrode 40, thereby colliding against the phosphor layers 36 at the relevant pixels and causing them to emit light.

Figure 7:
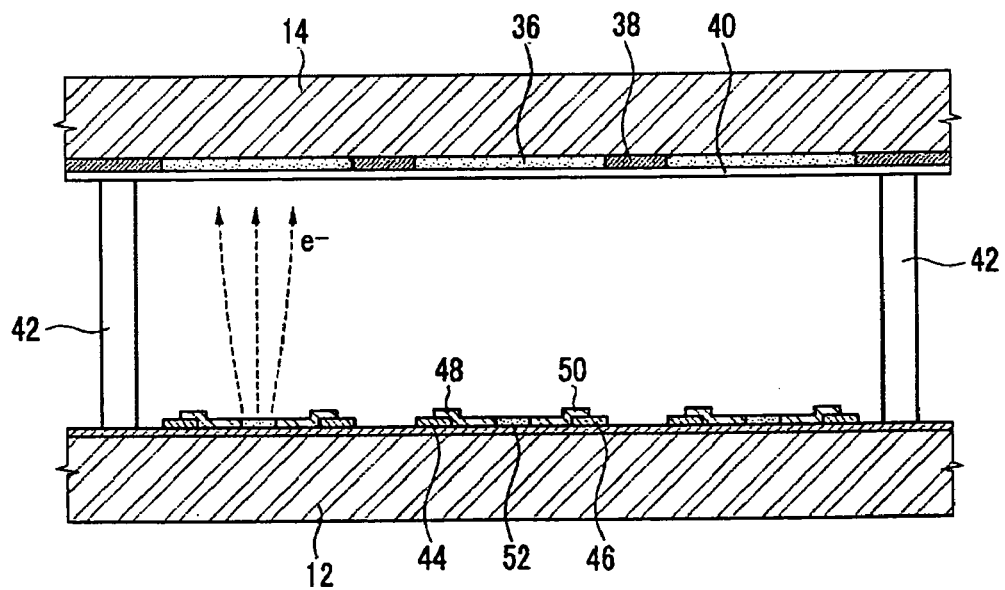
FIG. 7 is a partial sectional view of an Surface Conduction Emitter (SCE) electron emission display using a vacuum vessel according to an embodiment of the present invention.

As shown in FIG. 7, with an SCE electron emission display, first and second electrodes 44 and 46 are arranged on the first substrate 12 parallel to each other and spaced apart by a predetermined distance, and first and second conductive thin films 48 and 50 are placed close to each other while partially covering the surface of the first and the second electrodes 44 and 46. Electron emission regions 52 are disposed between the first and the second conductive thin films 48 and 50.

The first and the second electrodes 44 and 46 can be formed of various conductive materials. The first and the second conductive thin films 48 and 50 can be formed of micro particles based on a conductive material, such as nickel, gold, platinum, and palladium. The electron emission regions 52 can be formed of high resistance cracked portions provided between the first and the second conductive thin films 48 and 50, or can contain carbon and/or one or more carbon compounds.

As with the structure of the FEA electron emission display, phosphor layers 36, black layers 38 and an anode electrode 40 are formed on a surface of the second substrate 14.

With the above-described structure, when predetermined driving voltages are supplied to the first and the second electrodes 44 and 46, an electric current flows through the first and the second conductive thin films 48 and 50 horizontal to the surface of the electron emission regions 52, thereby causing a surface conduction electron emission. The emitted electrons are attracted by the high voltage supplied to the anode electrode 40, and migrated toward the second substrate 14, thereby colliding against the phosphor layers 36 at the relevant pixels and causing them to emit light.

With the above-structured electron emission display, an electron emission unit is formed at the active area of the first substrate 12, and a light emission unit is formed at the active area of the second substrate 14. The first and the second substrates 12 and 14 are sealed together using a sealing member 16 with support frames 18, adhesive layers 20 and fillers 22, and the interior thereof is exhausted.

Among the electron emission displays using the vacuum vessel, an FEA display and an SCE display have been illustrated. However, the electron emission display according to the present invention is not limited thereto.

Although exemplary embodiments of the present invention have been described in detail hereinabove, it should be clearly understood that many variations and/or modifications of the basic inventive concept taught herein still fall within the spirit and scope of the present invention, as defined by the appended claims.

What is claimed is:

1. A vacuum vessel, comprising:
a first substrate;
a second substrate facing the first substrate and spaced apart therefrom; and
a plurality of rectangular support frames, each having at least four sides and two ends, separately arranged along all edges of the first and the second substrates, at least two pairs of the rectangular support frames being separately arranged on at least two respective pairs of sides of the first and the second substrates:
wherein each end of the rectangular support frames facing an end of another rectangular support frame has a filler between the end of the rectangular support frames and the end of another rectangular support frame;
wherein each end of the rectangular support frames facing a side of another rectangular support frame has a filler between the end of the support frames and the side of another rectangular support frame; and
wherein each end of the plurality of rectangular support frames is perpendicular to the first and second substrates and is perpendicular to all sides of its respective abutting rectangular support frame.

2. The vacuum vessel of claim 1, wherein the first and the second substrates have a pair of long sides and a pair of short sides, and the plurality of rectangular support frames are arranged on the two long sides of the first and the second substrates and have a length less than or equal to half of the length of the long side.

3. The vacuum vessel of claim 1, wherein the first and the second substrates have a pair of long sides and a pair of short sides, and the plurality of rectangular support frames are arranged on the respective sides of the first and the second substrates and have a length less than or equal to half of the length of the respective side.

4. The vacuum vessel of claim 1, wherein the plurality of support frames has a height corresponding to a distance between the first and the second substrates.

5. The vacuum vessel of claim 1, wherein the plurality of support frames comprises a material selected from the group consisting of glass, ceramics, a mixture of glass and ceramics, reinforced glass, and a mixture of ceramics and reinforced glass.

6. The vacuum vessel of claim 1, wherein the plurality of support frames has a thermal expansion coefficient of 8.5~9.0 ppm/° C.

7. The vacuum vessel of claim 1, further comprising adhesive layers arranged on a surface of the plurality of support frames facing the first substrate and on an opposite-surface of the support frames facing the second substrate.

8. The vacuum vessel of claim 7, wherein the adhesive layers and the fillers comprise a glass frit.

9. An electron emission display device, comprising:
a first substrate;
a second substrate facing the first substrate and spaced apart therefrom;
an electron emission unit arranged on the first substrate;
a light emission unit arranged on the second substrate; and
a sealing member arranged at peripheries of the first and the second substrates to define a vacuum vessel together with the two substrates;
wherein the sealing member includes at least two pair of rectangular support frames, each having at least four sides and two ends, separately arranged on at least two sides of the respective pairs of the first and second substrates,
wherein adhesive layers arranged between the first substrate and the rectangular support frames and between the second substrate and the support frames,
wherein each end of the rectangular support frames facing an end of another rectangular support frame has a filler between the end of the rectangular support frames and the end of another rectangular support frame,
wherein each end of the rectangular support frames facing a side of another rectangular support frame has a filler between the end of the support frames and the side of another rectangular support frame; and
wherein each end of the support frame is perpendicular to the first and second substrates and is perpendicular to all sides of its respective support frame.

10. The electron emission display device of claim 9, wherein the first and the second substrates have a pair of long sides and a pair of short sides, and the rectangular support frames are arranged on the two long sides of the first and the second substrates with a length less than or equal to half of the long side.

11. The electron emission display device of claim 9, wherein the first and the second substrates have a pair of long sides and a pair of short sides, and the rectangular support frames are arranged on the respective sides of the first and the second substrates with a length less than or equal to half of the length of the respective side.

12. The electron emission display device of claim 9, wherein the adhesive layer has a thickness of 300~500 μm.

13. The electron emission display device of claim 9, wherein the adhesive layers and the fillers comprise a glass frit.

* * * * *